(12) United States Patent
Swartz et al.

(10) Patent No.: US 7,346,850 B2
(45) Date of Patent: Mar. 18, 2008

(54) SYSTEM AND METHOD FOR ICONIC SOFTWARE ENVIRONMENT MANAGEMENT

(75) Inventors: Gregory J. Swartz, Kokomo, IN (US); James B. Swartz, Kokomo, IN (US); Christopher J. Danforth, Bunker Hill, IN (US)

(73) Assignee: Cygnus Systems, Inc., Kokomo, IN (US)

( * ) Notice: Subject to any disclaimer, the term of this patent is extended or adjusted under 35 U.S.C. 154(b) by 439 days.

(21) Appl. No.: 09/878,009

(22) Filed: Jun. 8, 2001

(65) Prior Publication Data
US 2001/0028368 A1   Oct. 11, 2001

Related U.S. Application Data

(63) Continuation of application No. 09/097,283, filed on Jun. 12, 1998, now abandoned.

(51) Int. Cl.
G06F 13/00 (2006.01)
G06F 15/00 (2006.01)
(52) U.S. Cl. ..................... 715/763; 715/765
(58) Field of Classification Search .............. 345/835, 345/860, 786, 763, 765; 715/748, 780, 750, 715/840, 835, 860, 786, 854, 700, 737, 735, 715/743, 744, 761, 763–765
See application file for complete search history.

(56) References Cited

U.S. PATENT DOCUMENTS

| 5,375,200 A | 12/1994 | Dugan et al. |
| 5,479,599 A | 12/1995 | Rockwell et al. |
| 5,581,760 A | 12/1996 | Atkinson et al. |
| 5,675,752 A * | 10/1997 | Scott et al. ................. 715/866 |
| 5,682,536 A | 10/1997 | Atkinson et al. |
| 5,689,703 A | 11/1997 | Atkinson et al. |
| 5,717,877 A | 2/1998 | Orton et al. |
| 5,751,286 A * | 5/1998 | Barber et al. ............... 345/835 |
| 5,911,139 A | 6/1999 | Jain et al. |
| 5,973,692 A * | 10/1999 | Knowlton et al. .......... 715/835 |
| 6,002,401 A | 12/1999 | Baker |
| 6,026,433 A * | 2/2000 | D'Arlach et al. ........... 709/217 |
| 6,052,750 A * | 4/2000 | Lea ............................... 707/1 |

\* cited by examiner

*Primary Examiner*—Cao (Kevin) Nguyen
(74) *Attorney, Agent, or Firm*—Lesavich High-Tech Law Group, P.C.

(57) ABSTRACT

A method and system for storing, navigating and accessing files within an operating system through the use of a graphical thumbnail representing the video display of the active document within the active application, and organized chronologically by the most recent file 'captured'. Filenames, application names and thumbnail filenames are stored in an indexed file. The indexed file can consist of every document and application used during a session or categorically defined by project or tasks or personal preference. This also stores the application name and path eliminating the need to remember which application last edited the file and where the application is located.

17 Claims, 20 Drawing Sheets

SYSTEM AND METHOD FOR ICONIC SOFTWARE ENVIRONMENT MANAGEMENT

This is a continuation of U.S. patent application Ser. No. 09/097,283, filed Jun. 12, 1998 now abandoned.

BACKGROUND OF THE INVENTION

The present invention relates in general to systems and methods for managing files and documents in a computer system. More particularly, the present invention relates to graphical user interfaces for storing, navigating and retrieving files and documents in a computer system.

It is known to provide a graphical user interface (GUI) for application programs on a computer. Early GUIs were provided by applications such as word processors and spreadsheets. GUIs have since been incorporated into computer operating systems, and provide functions such as allowing an operator to access files and programs on the computer by using a mouse to select and activate icons that represent the files and programs. GUIs for accessing files and applications through icons are typically either part of or added to the underlying operating system that. manages storage of the files and execution of the applications. For example, the Windows™ operating systems from Microsoft Corporation, including Windows 3.X, Windows 95, and Windows NT, and the Macintosh™ operating systems from Apple Corporation all provide such GUIs.

Continual increases in the amount and complexity of information stored and manipulated by computer systems have required operators to interact with an increasing number of files and applications. The growth of computer networks and the corollary growth in shared data has also increased the amount of information accessible to the operator. Increases in the amount and complexity of information stored by computer systems and networks have also caused concomitant increases in the amount and complexity of the graphical information representing the underlying file system presented to the user by operating system GUIs.

SUMMARY OF THE INVENTION

According to aspects of the present invention, methods and systems are provided to allow a user to manage files for use by applications on a computer system while insulating the operator from the complexity of the underlying file system architecture of the computer operating system. The user can rely on the visual representations of the files without the need to recall or determine every directory path for every file's location. Visual cues are provided that eliminate the difficulties in retrieving documents based on file names and paths used in storage of files in multiple directories or on multiple computer systems.

The present invention provides an improved method and system for storing, navigating and retrieving files and documents in a computer system. A method by which this is accomplished includes the following: the use of graphical representations of the documents and applications as viewed on the screen at the time of 'capture', a Snapshot Navigator Menu that automatically appears when the mouse pointer is directed to the edge of the screen and disappears when the mouse leaves the visible area of the Snapshot Navigator Menu.

The present invention also provides an improved method and system for storing iconic interfaces to files and documents on the mass storage devices in a logical, organized fashion that eliminates the need for the user to memorize the exact or actual location of the files stored throughout the hierarchical directory structure employed by present day storage devices and operating systems.

The present invention further provides the user the capability to switch between applications, as well as documents that are currently open and/or open applications and documents, with one click of the mouse.

In addition, the present invention provides the user the ability to create 'template' documents for applications that may not support an internal 'template' format, by duplicating specific files and launching the template file and/or template file and application with a single click.

Additional features of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
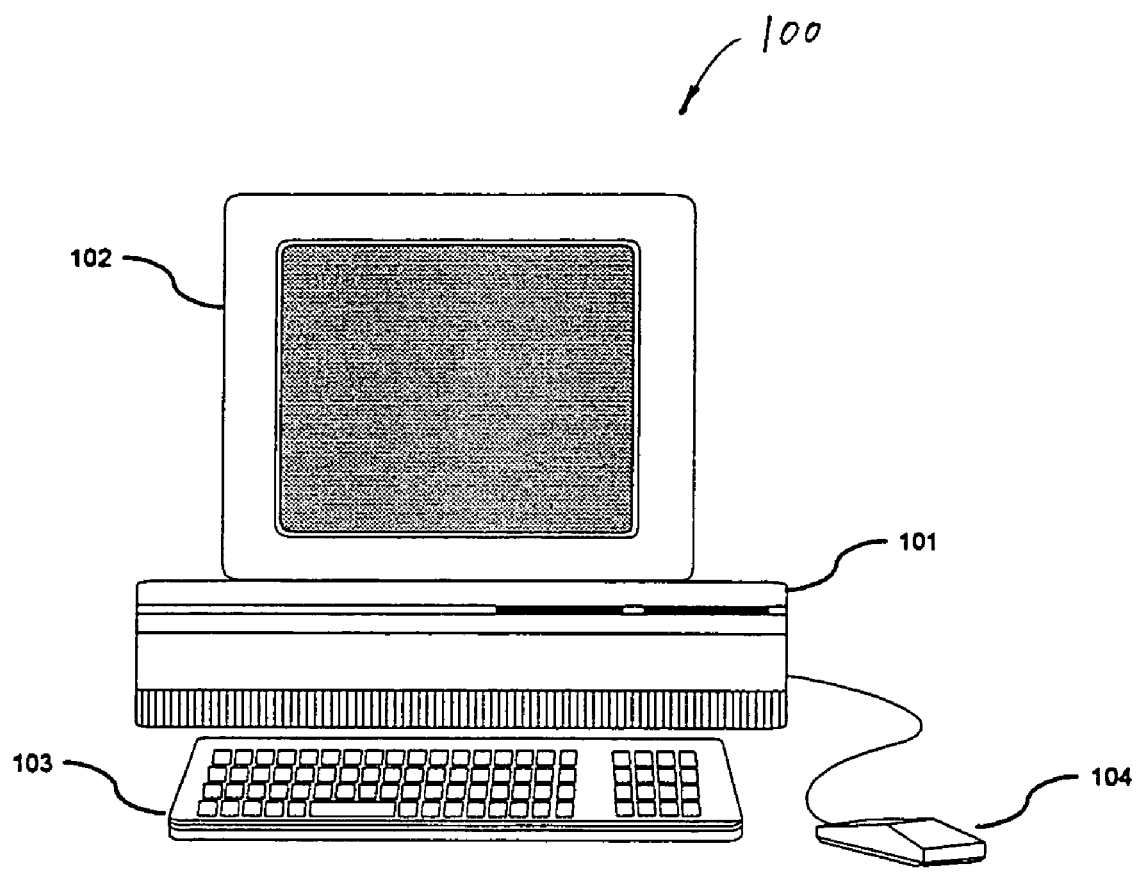
FIG. 1 is a pictorial representation of a data processing system which may be utilized to implement methods and systems of the present invention.

A brief explanation of 'window', 'handle', 'parent window', and 'child window' is necessary to understand the references to them throughout the discussion of the present invention. In the preferred embodiment, a 'window' in its purest form is any graphical element that is displayed on the screen. A 'handle' is an object identifier in memory, which can be associated with windows, files, and other elements in memory. A window without a 'parent window' is a top level window, which is typically an application. An application typically has many 'child windows' which make up the graphical interface consisting of buttons, scroll bars, icons, text boxes, etc. Child windows can have multiple child windows which can also have child windows, thereby constructing a structure of parent-child relationships between the various graphical elements of an application or top-level window.

It is understood that multiple applications can be opened or active simultaneously, but only one application can be in the 'foreground' accepting input (keyboard, mouse, etc.) instructions from the user at any given time, with any other applications currently open being in the 'background'. Likewise with MDI (multiple document interface) applications there can only be one document in the foreground accepting input (keyboard, mouse, etc.) instructions from the user at any given time and any other documents currently open within the application would be in the background. Document handles only exist with applications that support the MDI capability. Basically, MDI specifies whether or not an application can have multiple files open simultaneously to allow the user to switch between them during their editing process, and a non-MDI application would only support one file open at any give time. The term 'document' includes, but is not limited to, text files, graphic images, sound files, spreadsheets, databases, web pages with URL addresses, video clips, animations, compound documents which could include any the file formats mentioned, presentations, etc. A computer system includes storage devices that would store the application and document files in directories and subdirectories, such as a hard drive or floppy drive. In the preferred embodiment, applications and the operating system are provided with an implementation-independent Application Programming Interface (API) that provides a set of functions that are invoked by client and server applications to act upon particular objects.

'Subclassing' refers to the process of intercepting Windows messages that are sent to and from the operating system and 'windows' and forcing the operating system to call a function specified with the present invention before the operating systems calls the original function for that window. Windows messages are commands that are used by the operating system and the applications to communicate the need to perform specific functions. For example, the operating system will send a message to a window when the user has clicked on a button, in order to notify the application that it needs to perform the necessary functions associated with that button.

A 'File System Hook' is a function of the operating system that allows applications to monitor all activity within the file system to determine what files have been opened, saved, read, written, or deleted. The File System Hook actually intercepts the functions calls made to the operating system by any application currently open. The File System Hook has access to the following pieces of information: the process/application that requested the file access, the filename and path of the file that is being accessed, what type of access is being performed (save, open, read, etc.), whether or not the access was completed successfully, and other miscellaneous information.

With reference now to the figures and in particular FIG. 1, a computer system 100 which may be utilized to implement the method and system of the present invention includes a processor 101 coupled to a display screen 102, a keyboard 103, and a graphical pointing device 104. Processor 101 includes memory and one or more storage devices such as a hard disk drive and a floppy disk drive (not shown). By way of example, computer system 100 is an IBM-PC compatible computer running the Microsoft Windows 95 operating system and may or may not be connected to a local area network or other internetworking system. Graphical pointing device 104 may be implemented utilizing a mouse, light pen, touch sensitive screen, voice recognition hardware, or any other device suitable to control and operate the graphical user interface. A keyboard 103 'hot-key' typically consists of a combination of keystrokes that activate specific features or functions in applications. For example, pressing and holding down the 'SHIFT' key and then pressing the function key 'F1', and releasing both keys would be considered a 'hot-key' combination.

Figure 2:
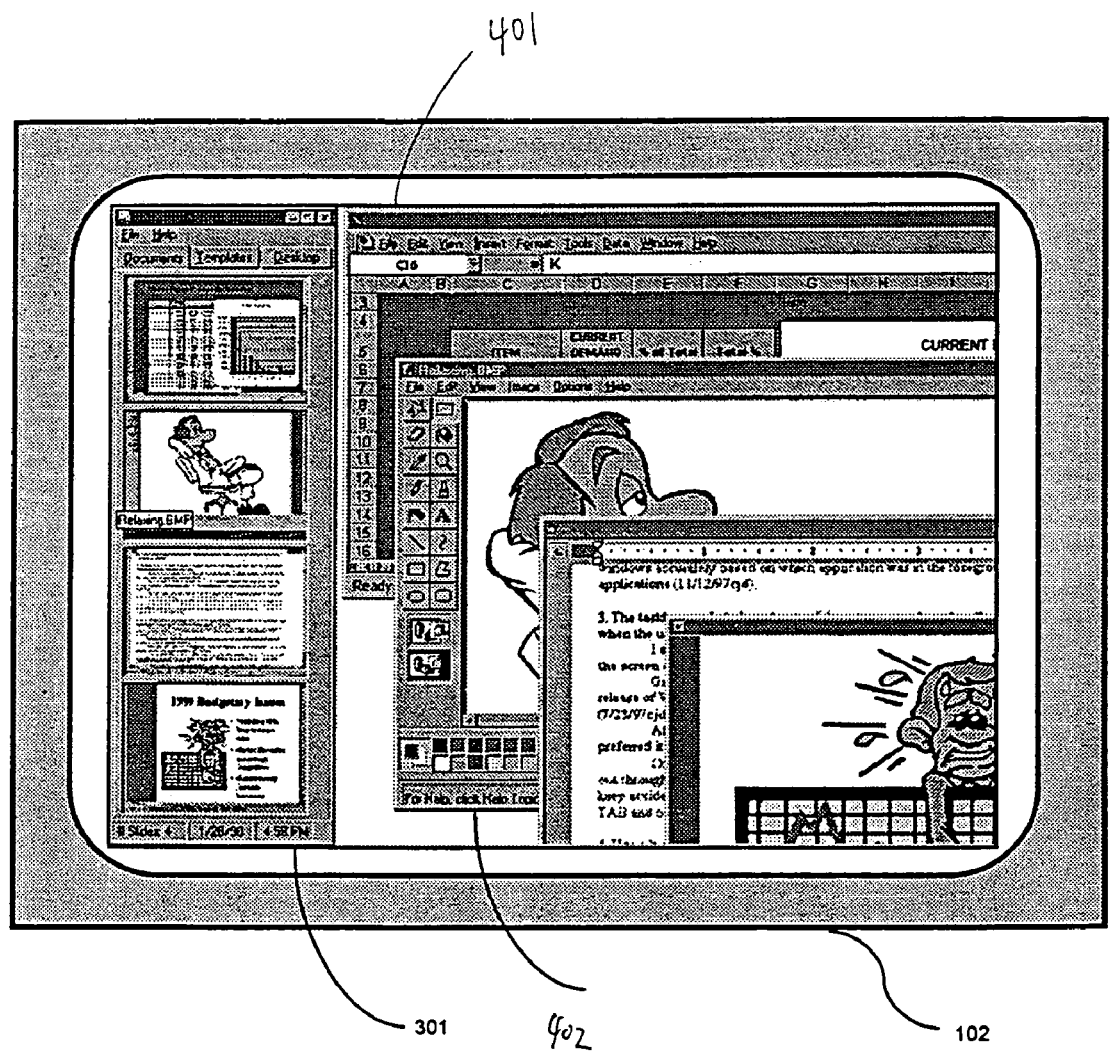
FIG. 2 is a pictorial representation of a computer display screen illustrating a method and system of the present invention.
Figure 3:
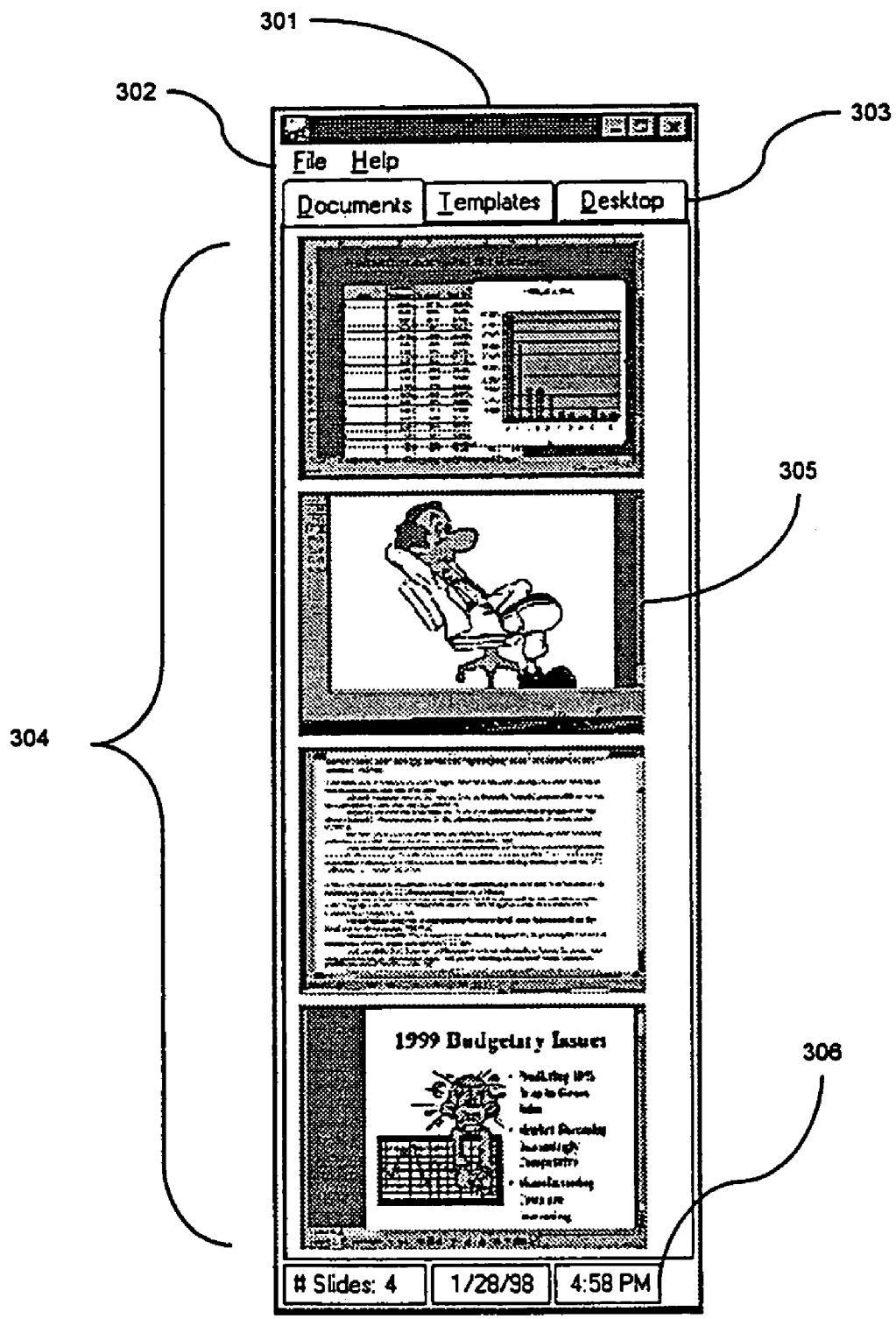
FIG. 3 is a pictorial representation of a graphical user interface for the methods and systems of the present invention.

FIG. 2 depicts computer display screen 102 displaying a Snapshot Navigator Menu 301 along with open applications, both MDI 401 and non-MDI 402 capable. Referring now to FIG. 3, Snapshot Navigator Menu 301 includes five basic elements: a menu bar 302, a tab strip 303, a File Snapshot List 304, individual File Snapshots 305, and a status bar 306. Snapshot Navigator Menu 301 is attached to the left or right edge of the screen and automatically appears when the mouse pointer is directed to the edge upon which the Snapshot Navigator Menu 301 resides. The Snapshot Navigator Menu 301 automatically disappears shortly after the mouse pointer moves away from the Snapshot Navigator Menu 301 and into other areas of the screen.

File Snapshot 305 includes a miniaturized graphical depiction of the screen at the time the document and/or application is open and was 'captured', using a screen capture of the active window, onto Snapshot Navigator Menu 301. Alternatively, File Snapshot 305 can be generated by constructing a graphical depiction based on the contents of the document without actually without actually creating a screen display. File Snapshot List 304 is a group of File Snapshots 305 that are saved/stored to the mass storage device with a filename that is typically representative to the collective content of the File Snapshots 305. An illustrative File Snapshot List 304 would be a group of File Snapshots 305 that would all pertain to a specific topic. An example of such a list would be text documents consisting of memos, letter, notes etc., as well as spreadsheet files, graphic files of mechanical drawings, etc. that collectively would be necessary for a person in management to prepare a budget for a department within a corporation.

An illustrative File Snapshot 305 includes the following information: graphic thumbnail image of the document at the point of capture, the document filename, the file object identifier, document handle (if applicable), the application filename, the application handle, and the application's MDI capabilities. The graphic thumbnail image illustratively is a screen capture of the document as displayed during manipulation by the application that has been scaled down to fit into one of the File Snapshot 305 positions on the Snapshot Navigator Menu 301. Tab strip 303 is used to switch between File Snapshots 305 and Template Snapshots (not shown) and Desktop Icons (not shown).

Template Snapshots are a miniaturized graphical depiction of the screen at the time the document was converted into a 'template', as well as the application filename and document filename. As discussed in more detail below, the 'template' is a duplicated copy of a File Snapshot 305 that allows users to open pre-formatted files within applications that may or may not inherently support a template format for its files.

Desktop Icons are graphical icons that are positioned onto the initial screen of the preferred embodiment and are easily accessible when applications are either not open or have been 'minimized'. Minimized is a state when the application has been reduced to a small icon and is longer being displayed onto the main screen. The Desktop Icons feature allows Snapshot Navigator Menu 301 to display all of these icons at any time, whether applications are open and being displayed on the screen or not, making them easily accessible to the user.

Status bar 306 is used to display the current date and time as well as the number of File Snapshots 305 or Template Snapshots currently open and to display any other desired information during operation. Menu bar 302 is used to access the commands available for opening, saving, and printing of File Snapshot Lists 304, as well as exiting the program and accessing on-line help, configuration settings and other advanced features. The process of 'capturing', as described in more detail below, includes recording a graphical representation of the document as well as the document and application filenames, including the entire directory path, and placing the image representative of this information onto the Snapshot Navigator Menu 301. The process of 'retrieving', as described in more detail below, includes opening the application and document from their respective locations on the mass storage device, unless either the application or document is currently active (open in memory). If an application or document is already active, 'focus' is switched to that application and document. Focus indicates which window currently is receiving mouse and keyboard events.

Figure 4:
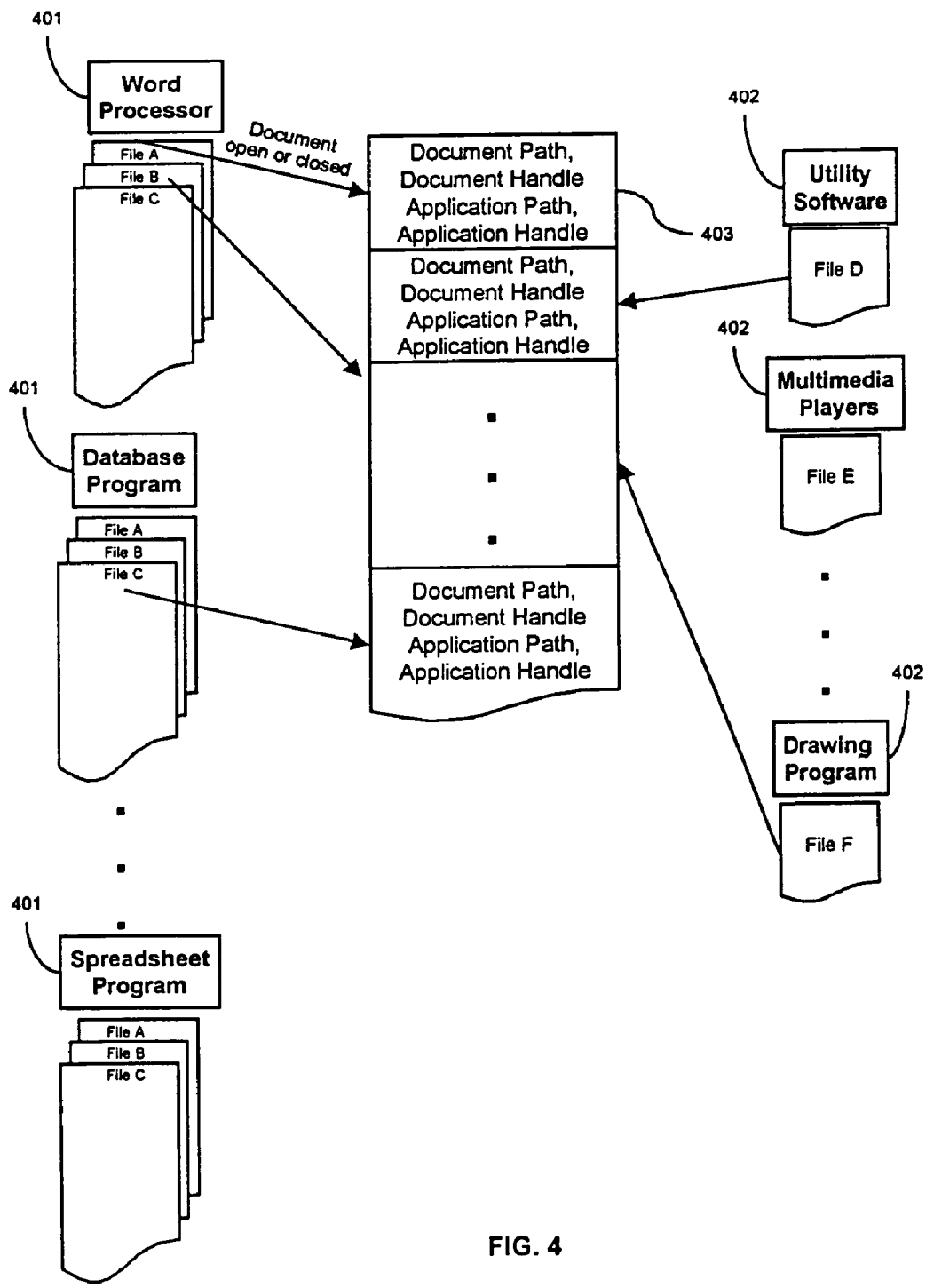
FIG. 4 is a pictorial representation of a file access tracking log and its interaction with two basic types of applications, MDI and non-MDI.

Referring now to FIG. 4, there is depicted a pictorial representation of the File Access Tracking Module's 'log' that is dynamically modified to contain the information about all documents that are currently open and the applications that they reside in. MDI-capable applications 401 illustrate how each application is listed with each file entered into the log. Non-MDI-capable applications 402 illustrate how there exists only one entry for each application that has one file open within it. Log file 403 maintains the application filename, application handle, document filename, and document handle (if applicable) provided for each application and file.

Figure 5:
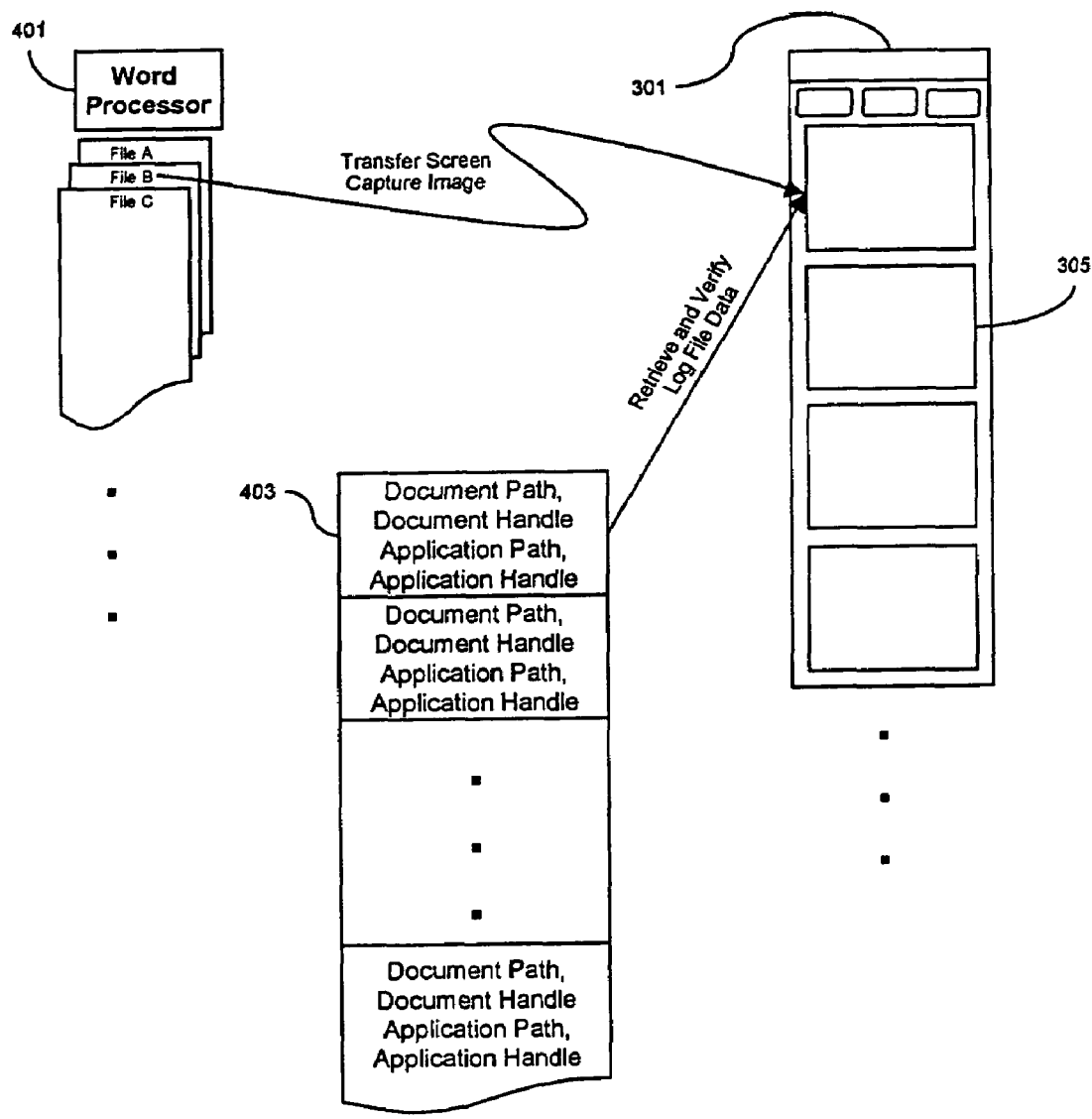
FIG. 5 is a pictorial representation of a document capture sequence illustrating the interaction with an application and file, a log file, and a user interface to the present invention.

Referring now to FIG. 5, there is depicted a pictorial representation of the document capture sequence. This sequence is initiated by the user pressing a keyboard capture hot-key while working within an application 401, 402. A screen capture of the document with the application is transferred to the File Snapshot 305 of Snapshot Navigator Menu 301, as well as the corresponding path and handle information from the File Access Tracking Module log file 403.

Figure 6:
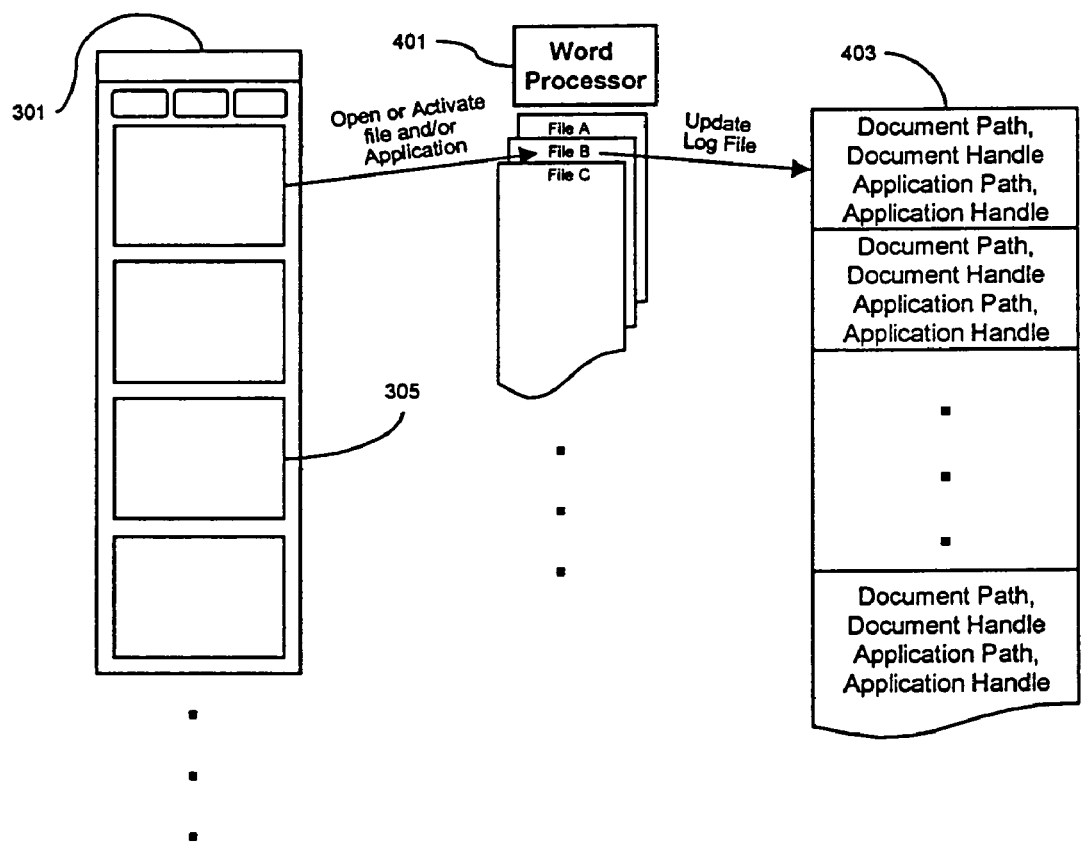
FIG. 6 is a pictorial representation of a document retrieve sequence illustrating the interaction with a user interface according to the present invention, an application and file, and a log file.

Referring now to FIG. 6, there is depicted a pictorial representation of the document retrieve sequence. This sequence is initiated by the user clicking on one of the File Snapshots 305 of Snapshot Navigator Menu 301. The application 401 and/or the document is either opened or simply activated and brought to the foreground and then the application filename, application handle, document filename and document handle (if applicable) are transferred to the File Access Tracking Module where the log file 403 is updated.

Figure 12:
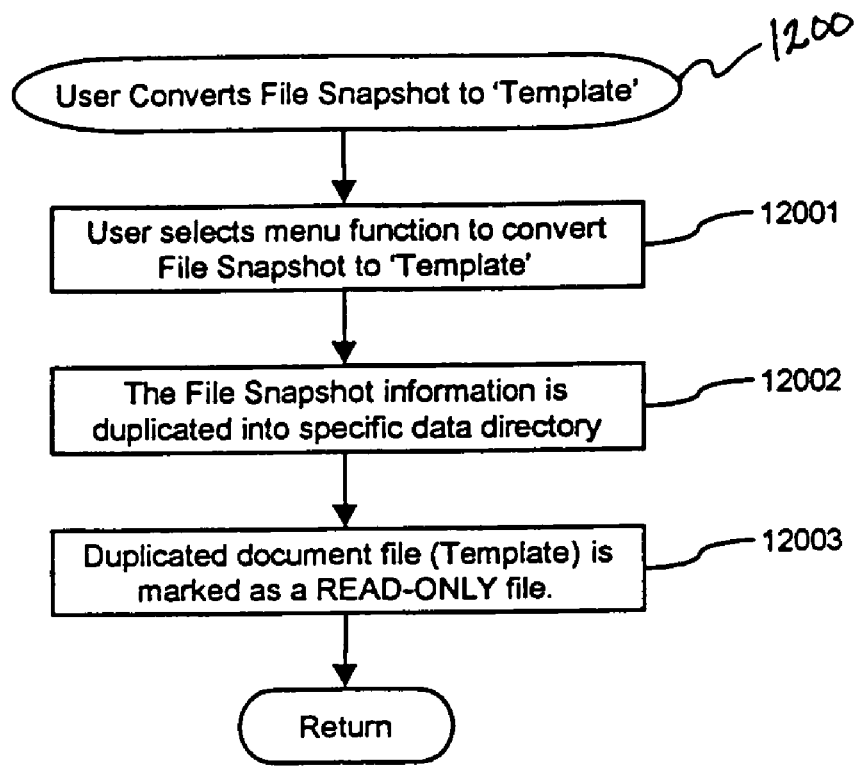
FIG. 12 is a flow diagram of a document to template conversion process.
Figure 13:
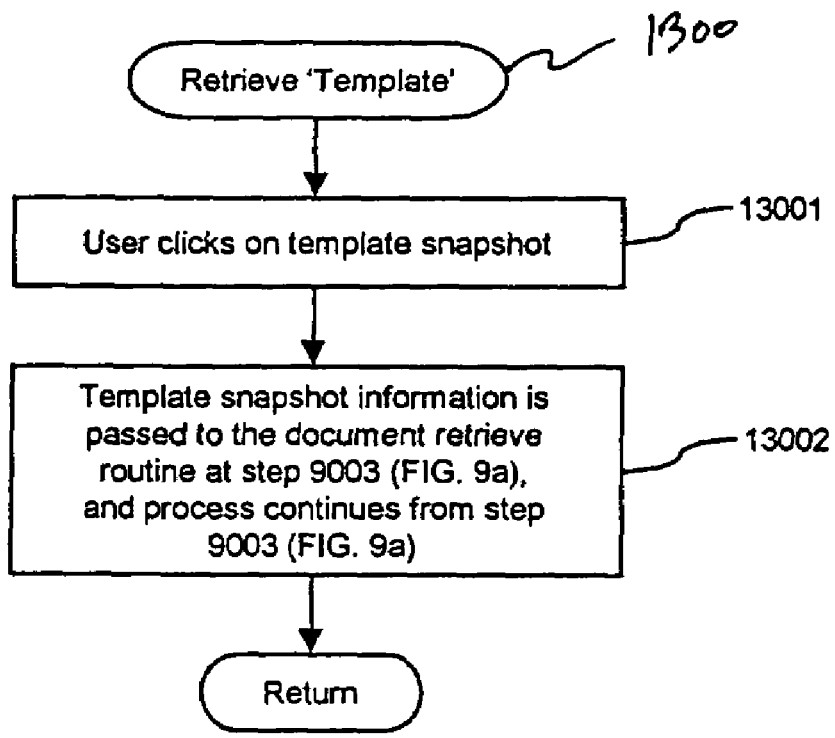
FIG. 13 is a flow diagram of a template retrieve routine.

FIGS. 7-11 illustrate the process of capturing and retrieving files from their original locations and their respective editing applications onto and from, respectively, Snapshot Navigator Menu 301. FIGS. 12 and 13 illustrate the process of converting documents to 'templates' and retrieving 'templates', respectively.

Figure 7:
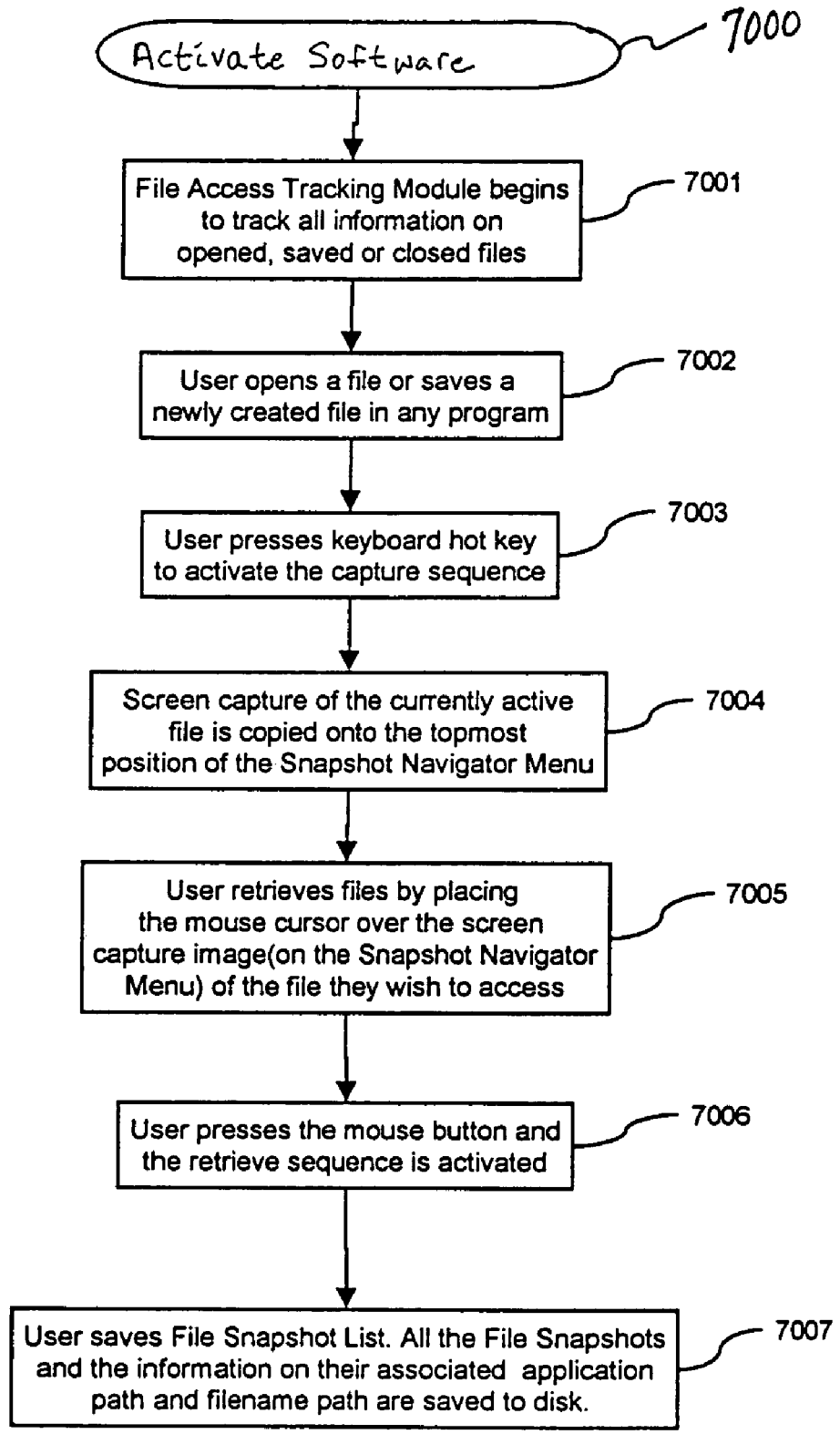
FIG. 7 is a flow diagram of the basic operation of software according to the present invention.

In general, as illustrated in FIG. 7, the user begins by launching the software as described in the present invention in step 7000. In step 7001 the File Access Tracking Module begins to track each file as it is opened and the respective application that opened the file as well as the window handle for the application and the document, if the document is opened within an application supporting standard MDI features. Tracking of file openings by the File Access Tracking Module is discussed in more detail below in reference to FIG. 10. Next, in step 7002, the user proceeds to open a file or saves a newly created file to a storage device. Next in step 7003, at any time during the process of editing and/or viewing the file within the application they have opened, the user presses a keyboard hotkey to activate the capture sequence. The capture sequence is discussed in detail below in reference to FIGS. 8*a-c*.

In step 7004, the screen capture of the currently active file and its application are copied onto the topmost position of the Snapshot Navigator Menu 301 along with the corresponding application directory path and file path. Next in step 7005, the user places the mouse over the graphical representation of the file being manipulated and in step 7006, the user clicks the mouse button and the retrieve sequence is activated. The retrieve sequence is discussed in detail below in reference to FIGS. 9*a-f* Next, in step 7007, when the user has 'captured' the documents and would like to store this listing to a storage device, the listing is stored with each document filename, application filename and the graphic thumbnail image.

Figure 8A:
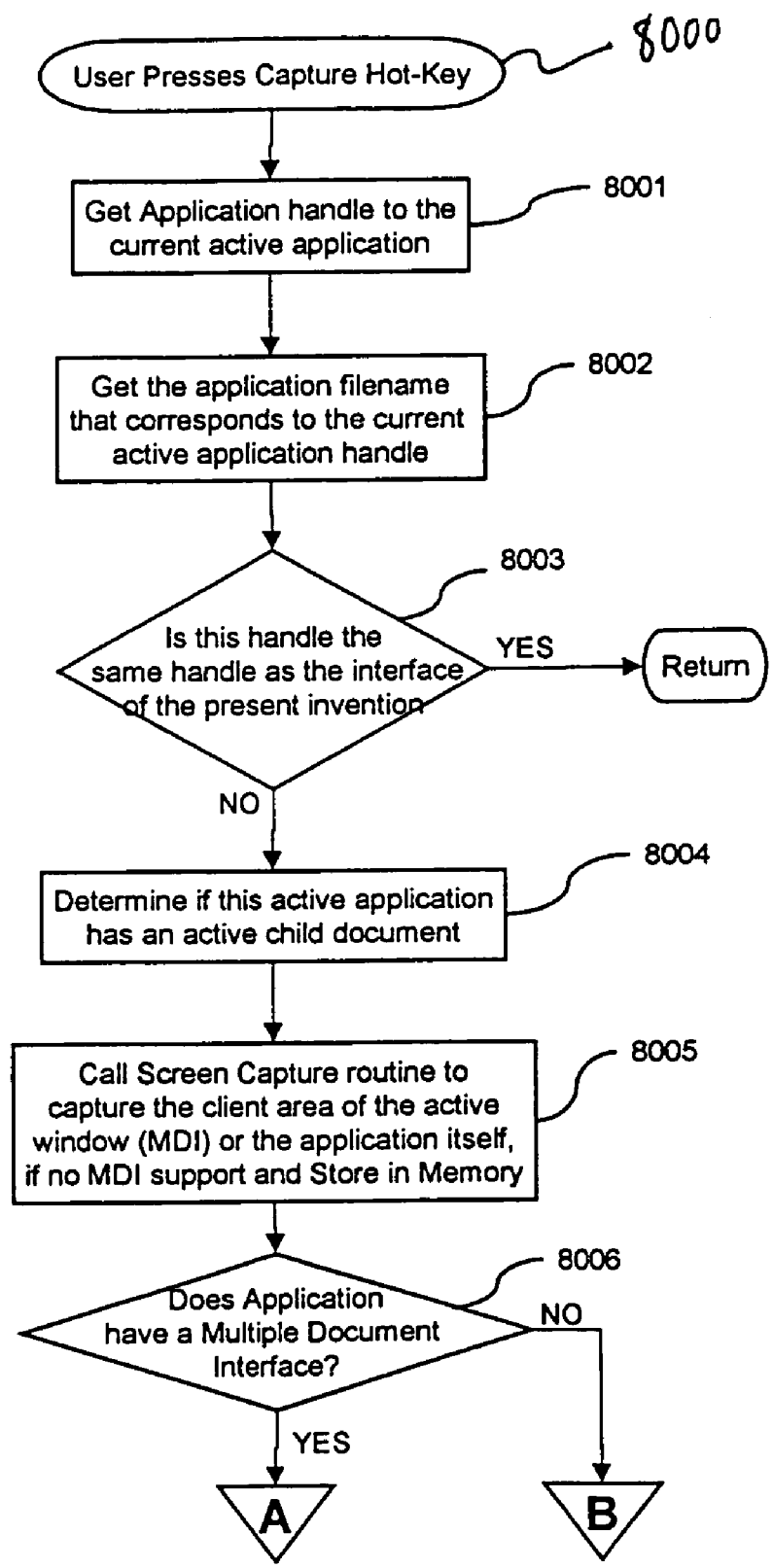
FIGS. 8*a-c* are a flow diagram of a capture routine.
Figure 8B:
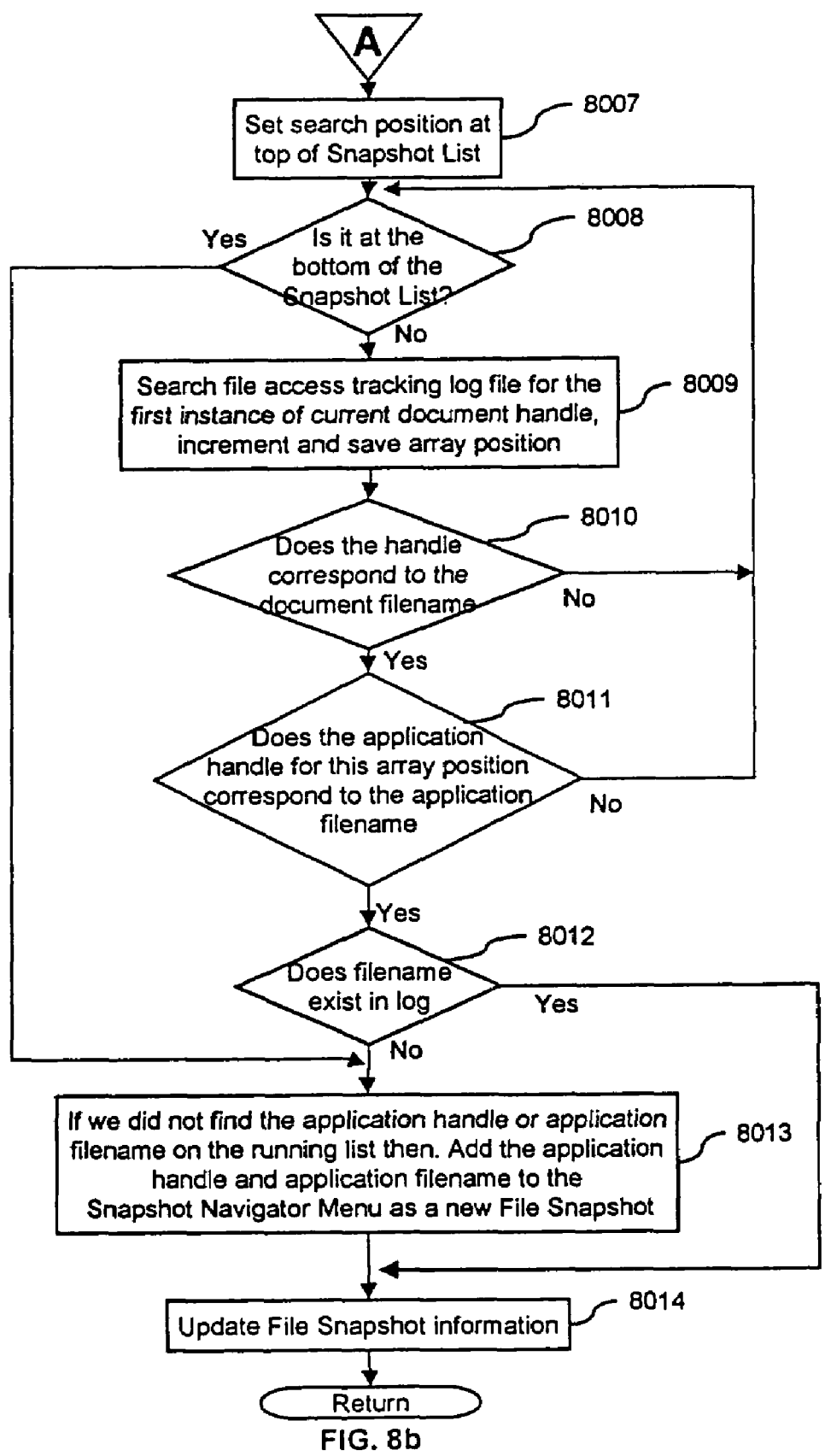
Figure 8C:
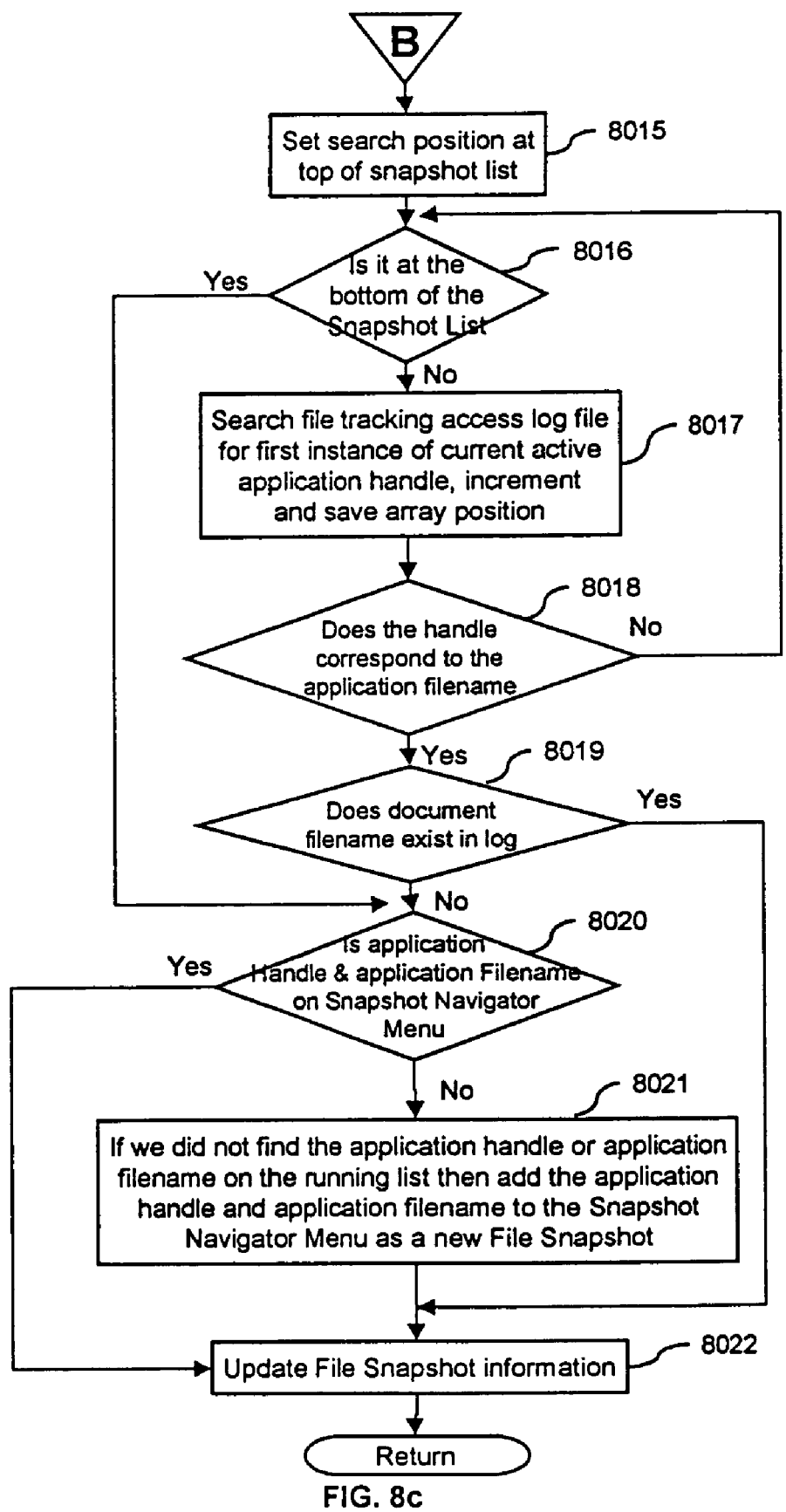

FIGS. 8*a-c* are detailed flow diagrams of the capture process that is activated when the user presses the capture hotkey in step 8000. FIG. 5 shows a functional diagram of the capture process. In this routine the screen capture 305 and information from the log file 403 are verified and transferred to the Snapshot Navigator Menu 301. In step 8001, by intercepting the hotkey keystroke throughout the entire operating system the active application can be determined by an API function call. Another API function call is used to determine the application window handle (the object identifier in memory used to identify the graphical window of the application) of the application that is currently active. In step 8002, an API function call is used to determine the filename and path of the active application. In step 8003, the application handle is compared to the application handle of the software, that is the present invention, and if the handles are identical this capture is discarded and system control is returned to the user; otherwise the process continues. In step 8004, the application handle is interrogated to determine what, if any, child window handles exists and if any of those handles have characteristics that correspond to the criteria for an MDI interface. In step 8005; an API function call is made to perform a screen capture of the contents of a specified window handle. If a child window handle meets the specified criteria for an MDI then a screen capture function is performed on that child window and stored in memory, otherwise the screen capture function is performed on the entire application window and stored in memory. In step 8006, the characteristics of the application window are analyzed to determine if the application supports MDI, in which case the process continues to step 8007. If the application is non-MDI compliant then the process continues to step 8015.

In step 8007, a search pointer is positioned at the top of a list of files that have been logged by the File Access Tracking Module to begin searching through the most recently logged files and applications. In step 8008, the search pointer is checked to see if it is at the bottom of the list, in which case control transfers to step 8013. If the search pointer is not at the bottom of the list, then in step 8009 the document handle from the log file 403 is retrieved for the instance of the current document handle obtained in 8004. This information is saved, the pointer is incremented and stored, and control then proceeds to step 8010. In step 8010, the document handle captured from step 8004 is compared to the retrieved document handle, and if they match then control proceeds to step 8011. If the document handles do not match then control returns to step 8008 to examine the next position in the list. In step 8011, the application handle in the list is compared to the application handle captured from step 8001 and if they match control proceeds to step 8012. If the application handles do not match then control returns to step 8008 to examine next position in the list.

In step 8012, the document filename is checked to see if it exists in the File Access Tracking Module's log file 403, and if so control proceeds to step 8014. If the document filename does not exist in the log then control proceeds to step 8013. In step 8013, if the current application handle or application filename could not be found in the log, then the application handle and application filename get added to the Snapshot Navigator Menu 301 with a 'blank' filename (blank actually consists of a filename "*No Filename Associated*"), and then control proceeds to step 8014. In step 8014, the File Snapshot List 304 is updated with this newly acquired information for the application handle, application filename, and document filename, document handle, where applicable, and then processing is return to the user.

In step 8015, the search pointer is positioned at the top of the list of files that have been logged by the File Access Tracking Module to begin searching through the most recently logged files and applications. In step 8016, the search pointer is checked to see if it is at the bottom of the list. If it is then control transfers to step 8020, and otherwise it continues to step 8017. In step 8017, the document handle from the log file 403 for the instance of the current document handle obtained in 8004 is retrieved. This information is saved, the pointer is incremented and stored, and control then proceeds to step 8018. In step 8018, the captured application handle from step 8001 is compared to the application handle in the list at this position. If the application handles match then a check is made to determine if the captured application filename from step 8002 matches the application filename in the list. If the filenames match then control proceeds to step 8019, otherwise control returns to step 8016.

In step 8019, the filename of the document is checked to see if it exists in the File Access Tracking Module log file 403. If it does then control transfers to step 8022, otherwise control proceeds to step 8020. In step 8020, the application handle and application filename are compared with all the File Snapshots 305 on the Snapshot Navigator Menu 301 to see if it has already been captured. If it has been captured then the document filename information is retrieved from the Snapshot Navigator Menu 301 and control transfers to step 8022, otherwise control proceeds to step 8021. In step 8021, if the current application handle or application filename could not be found in the log, then the application handle and application filename are added to the Snapshot Navigator Menu 301 with a 'blank' filename (blank actually consists of a filename "*No Filename Associated*"), and control proceeds to step 8022. In step 8022, the File Snapshot List 304 is updated with this newly acquired information for the application handle, application filename, and document filename, where applicable, and then processing is returned to the user.

FIGS. 9a-f provide a detailed flow diagram of the retrieve process that is activated from the user clicking on one of the File Snapshots 305. FIG. 6 shows a functional diagram of the retrieve process. In the retrieve process, information from the File Snapshots 305 is retrieved. After verifying the accuracy of the information, the file and/or application 401 is opened or made active and the updated information is stored in the log file 403. Many variables must be evaluated throughout the process of retrieving documents in order to eliminate the possibility of an attempt to open a document a second time if it is already open, to eliminate the possibility of opening multiple copies of the same application, as well as to determine when to open a file from a mass storage device or when to simply make that document active if it is already open.

Figure 9A:
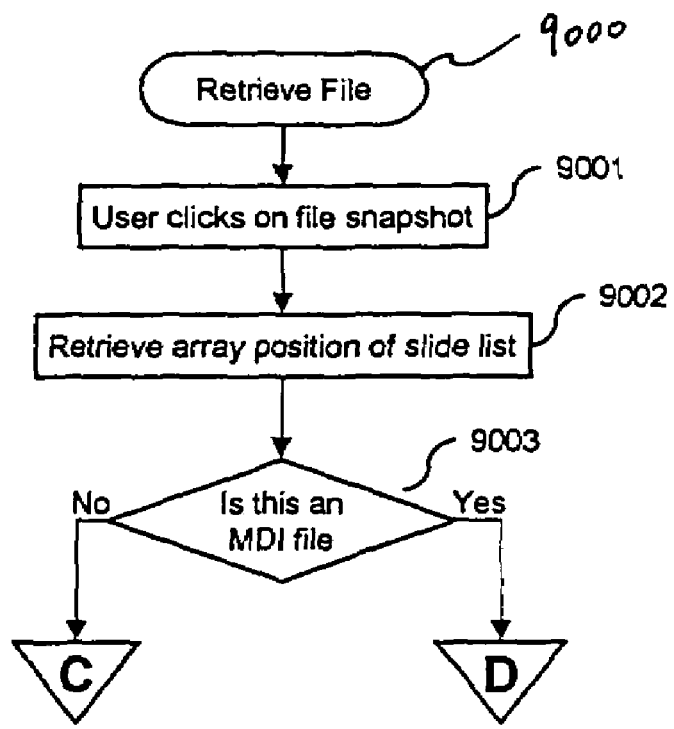
FIGS. 9*a-f* are a flow diagram of a retrieve routine.

Referring to FIG. 9a, the retrieve process is activated in step 9000 when a thumbnail or individual File Snapshot 305 is selected from Snapshot Navigator Menu 301. In step 9001, the user clicks on one of the File Snapshots 305. In step 9002, a pointer position for this File Snapshot 305's information is retrieved. In step 9003, the File Snapshot 305 information is evaluated and if the file is from an MDI-capable application then control proceeds to step 9014, otherwise it proceeds to step 9004.

Figure 9B:
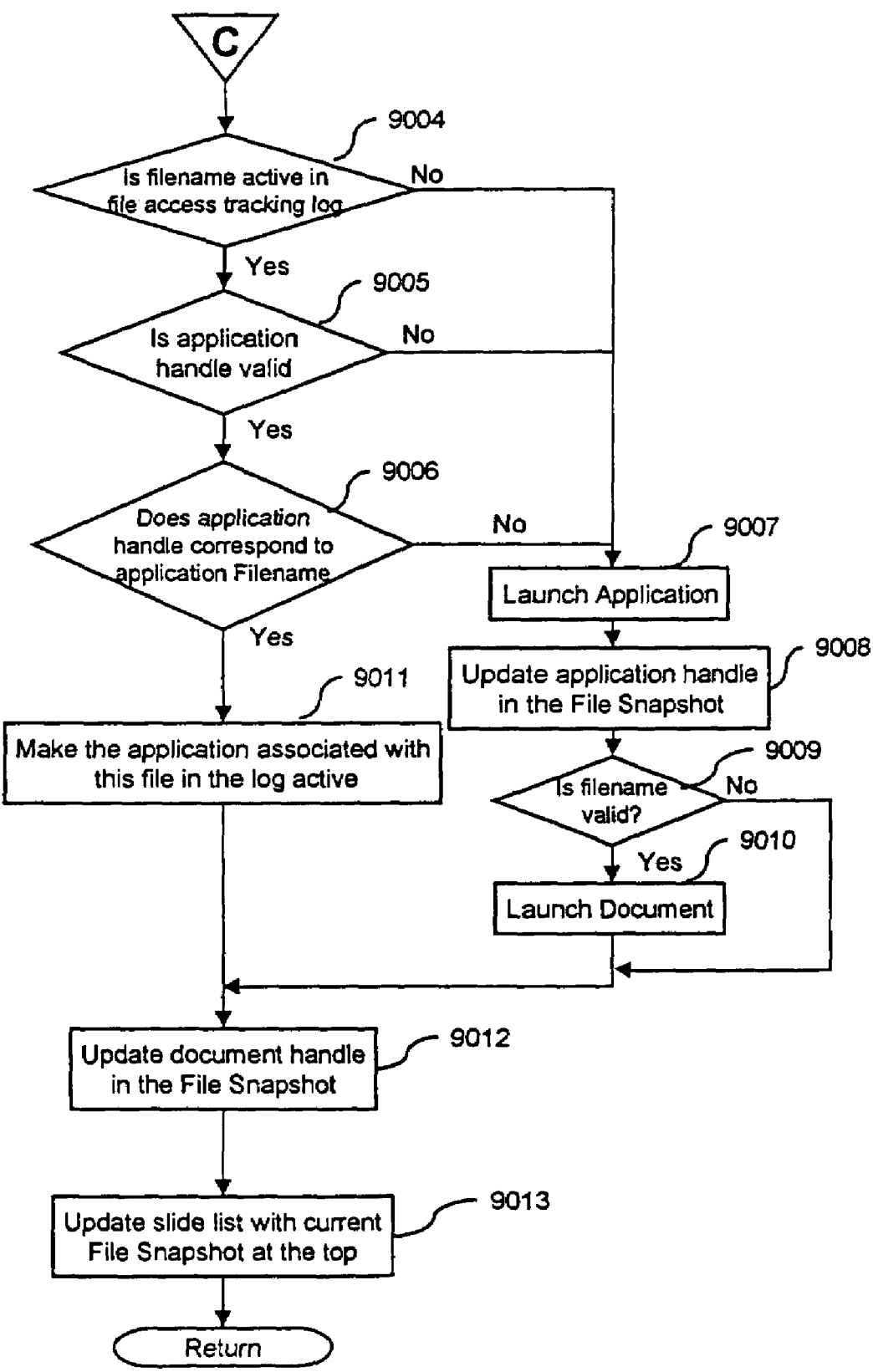

Referring now to FIG. 9b, in step 9004 the filename for the document is compared to information from the File Access Tracking Module log file 403 to see if the file is currently open. If the file is currently open then control proceeds to step 9005, otherwise it proceeds to step 9007. In step 9005, the application handle is checked to see if it is still valid in memory, in which case control proceeds to step 9006, and otherwise it transfers to step 9007.

In step 9006, the application handle is evaluated to determine if the application that owns the application handle corresponds to the application filename that is stored in the File Snapshot 305 that is being activated. If they correspond then control transfers to step 9011, otherwise it proceeds to step 9007. In step 9007, the application filename stored in the File Snapshot 305 is launched. In step 9008, the application handle is retrieved from the operating system and the application information for this File Snapshot 305 is updated. In step 9009, the filename is evaluated to see if it is a valid filename and if it exists on the designated mass storage device, in which case control proceeds to step 9010, otherwise it transfers to step 9012. In step 9010, the document is launched within the application and the document handle is retrieved from the operating system.

In step 9011, the application that is associated with the File Snapshot 305 that the user activated is brought to the foreground and made active. In step 9012, the document handle for this File Snapshot 305 is updated. In step 9013, the Snapshot Navigator Menu 301 information is updated and the File Snapshot 305 that was activated is moved to the topmost position and all the other File Snapshots 305 are moved down one position in the File Snapshot list 304, and processing is returned to the user.

Figure 9C:
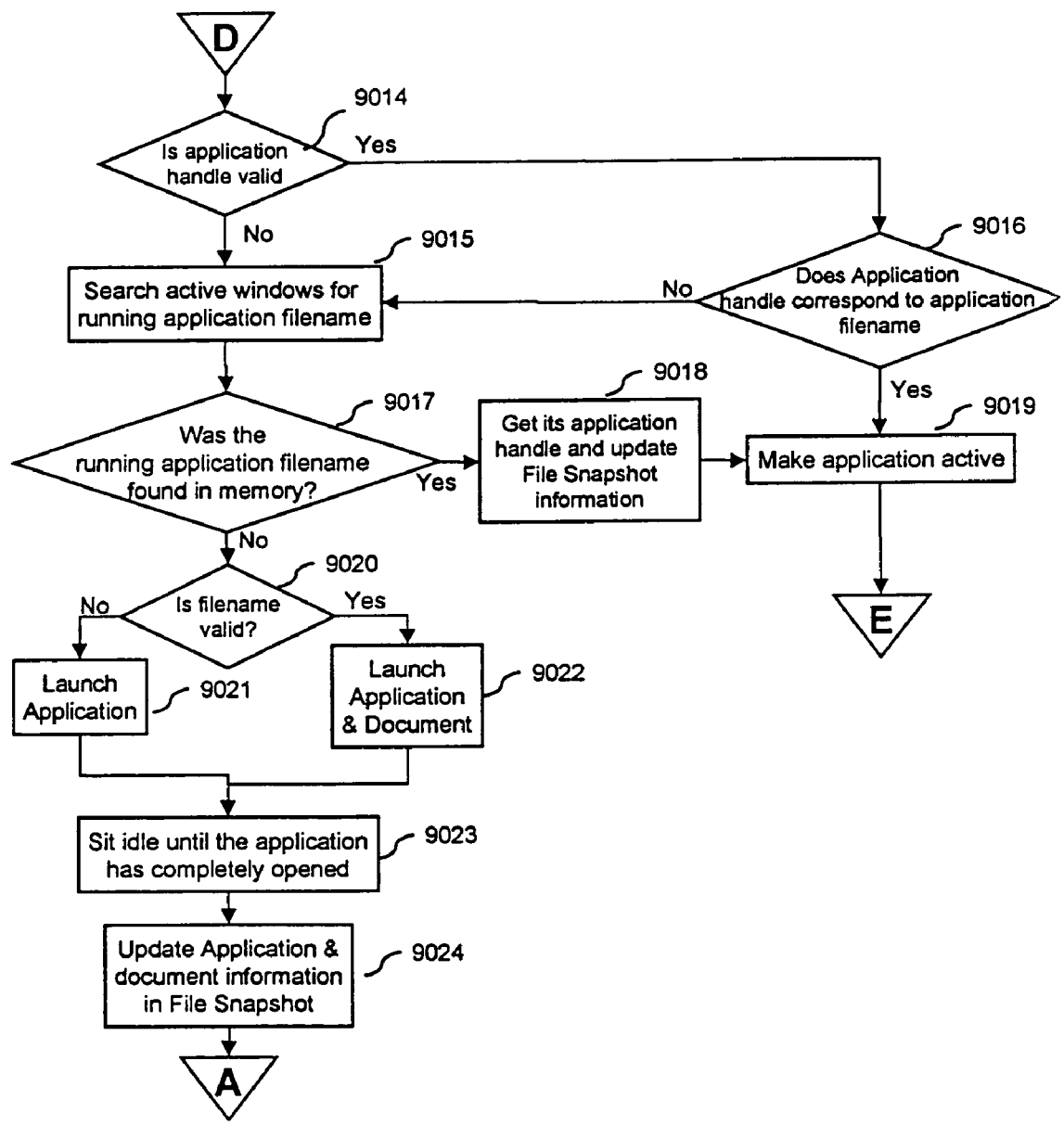

Referring now to FIG. 9c, in step 9014 the application handle is evaluated to determine if it is still valid in memory. If it is then control transfers to step 9016, otherwise proceeds to step 9015. In step 9015, the operating system is queried to return the filename for every application currently open, and each open application filename is checked to see if it matches the handle of the application that is being launched. Control then proceeds to step 9017, in which the application filename that is being launched is checked to see if it was found open in memory. If so, then control proceeds to step 9018, otherwise it transfers to step 9020.

In step 9018, the application handle for the application filename that was found is retrieved from the operating system and the application filename and application handle for the File Snapshot 305 is updated. In step 9019, the application is brought to the foreground and made active and control proceeds to step 9025.

In step 9016, the application handle is compared to the application filename to see if they correspond. If the application handle and filename correspond then control transfers to step 9019, otherwise it proceeds to step 9015. In step 9020, the document filename is evaluated to see if it is valid and exists on the mass storage device. If so, then control proceeds to step 9022, otherwise it proceeds to step 9021. In step 9021, only the application is launched and control proceeds to step 9023. In step 9022, the application and document are both launched and then control proceeds to step 9023.

In step 9023, processing pauses until the application is opened completely. The operating system is then queried to return application handle, and control proceeds to step 9024. In step 9024, the information for the File Snapshot 305 is updated with the new application handle and document handle. Control then proceeds to step 9038.

Figure 9D:
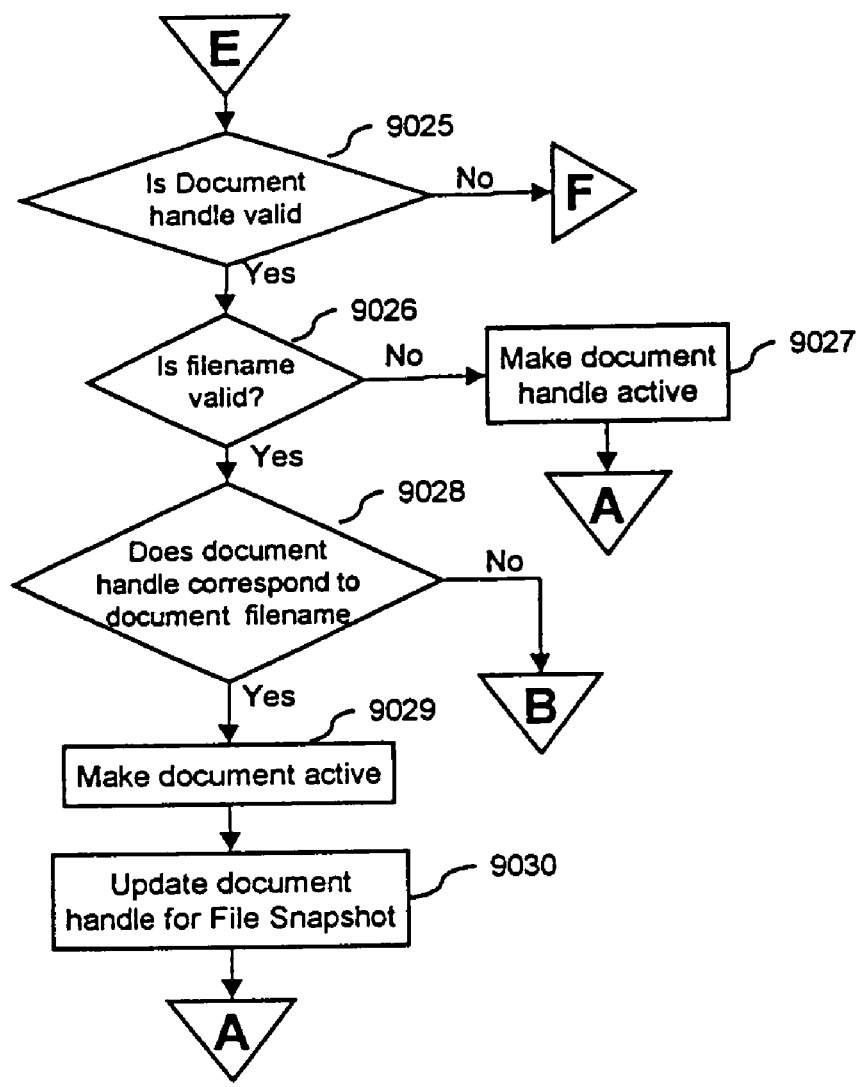

Referring now to FIG. 9d, in step 9025 the document handle is evaluated to see if it is valid in memory. If it is then control proceeds to step 9026, otherwise control proceeds to step 9031. In step 9026, the filename is evaluated to see if it is valid and exists on the mass storage device. If it is then control proceeds to step 9028, otherwise control proceeds to step 9027. In step 9028, the document handle is compared to the document filename to see if they correspond. If they do then control proceeds to step 9029, otherwise it proceeds to step 9037. In step 9029, the document within the application is brought to the foreground and made active, and control then proceeds to step 9030. In step 9030, the document handle information for the File Snapshot 305 is updated and then control proceeds to step 9038. In step 9027, the document is brought to the foreground and made active, and control then proceeds to step 9038.

Figure 9E:
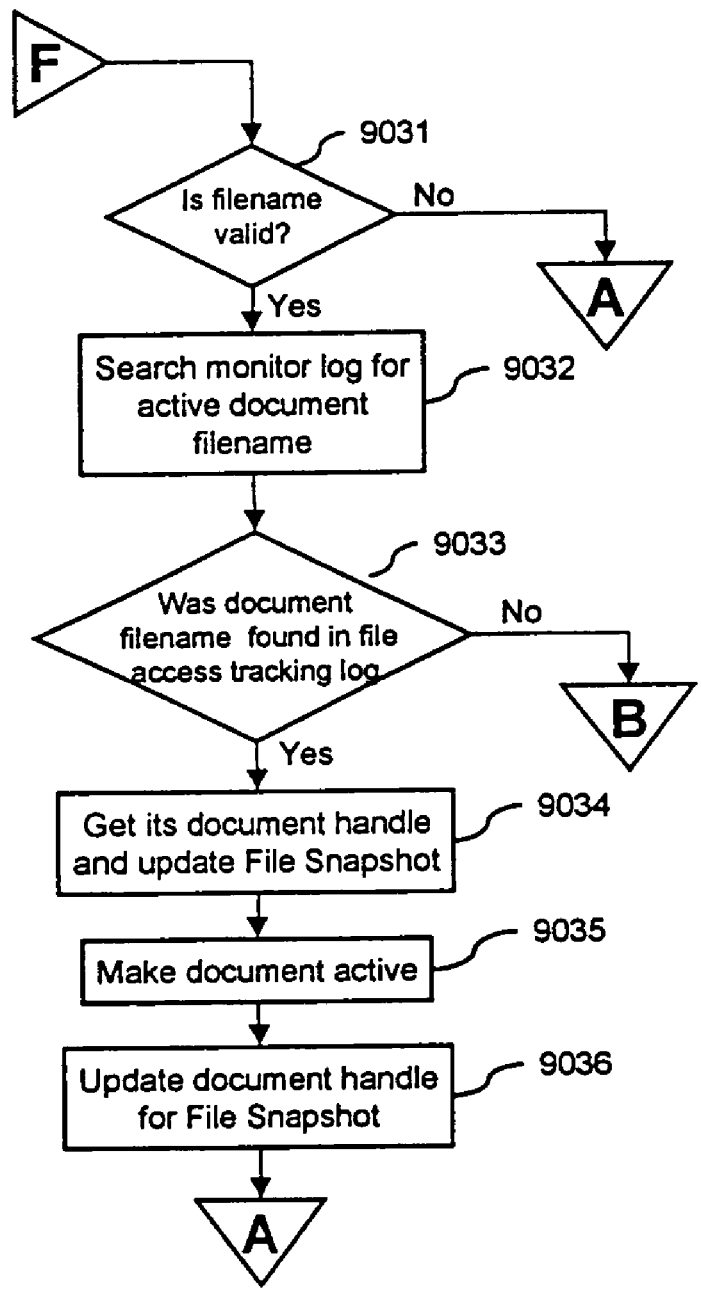

Referring now to FIG. 9e, in step 9031 the document filename is evaluated to see if it is valid and exists on the mass storage device. If both conditions are true then control proceeds to step 9032, otherwise it transfers to step 9038. In step 9032, the File Access Tracking Module log file 403 is searched to find the document filename that is being activated. Next, in step 9033, if the document was found in the File Access Tracking Module log file 403 then control proceeds to step 9034, otherwise control transfers to step 9037. In step 9034, the document handle is retrieved from the File Access Tracking Module log file 403. Next, in step 9035, the document is brought to the foreground and made active within the application and then control proceeds to step 9036. In step 9036, the document handle information for the File Snapshot 305 is updated and control then proceeds to step 9038.

Figure 9F:
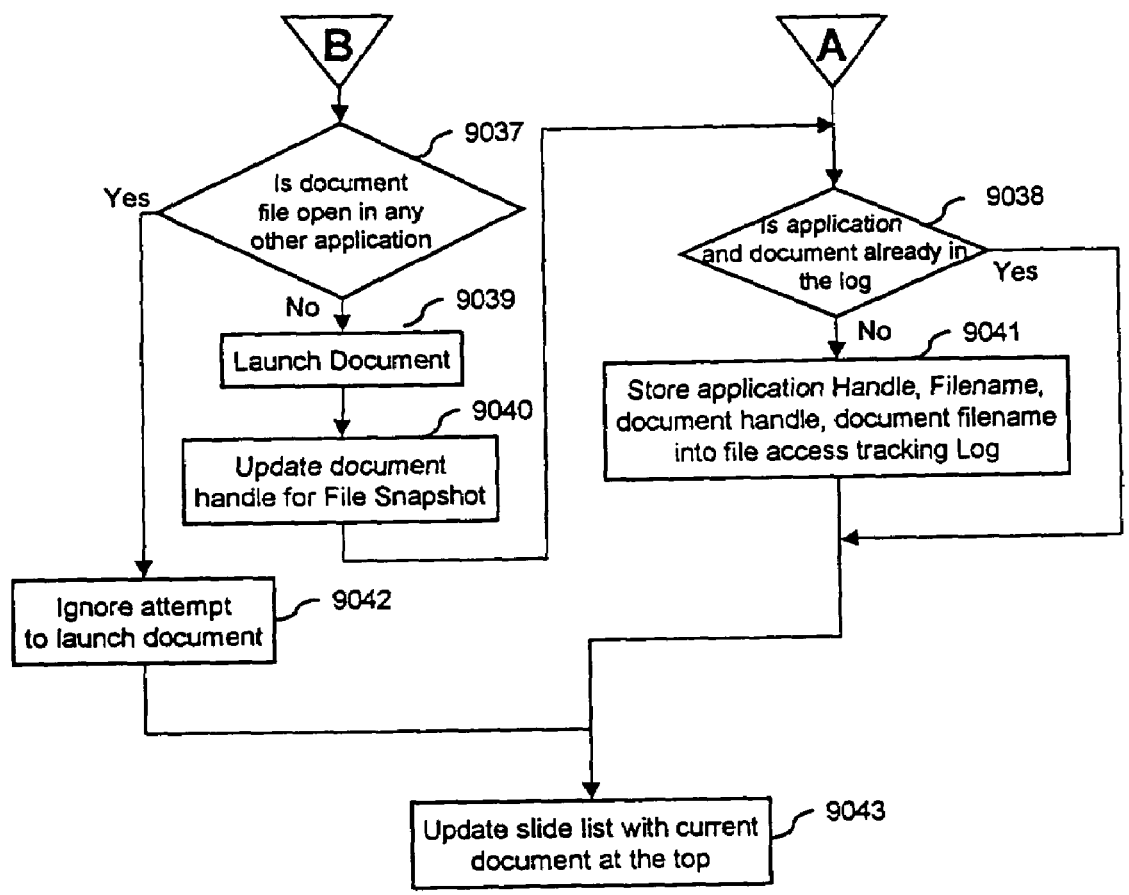

Referring now to FIG. 9f, in step 9037 the document file is checked to see if it is already open in another application. If it is, then control transfers to step 9042, otherwise control proceeds to step 9039. In step 9039, the document file is launched within the application. Next in step 9040, the document handle for the File Snapshot 305 is updated with this information. Alternatively, in step 9042, error checking is performed to qualify the information for this File Snapshot 305 which has been determined in step 9037 to be faulty, and the attempt to launch the file is ignored.

In step 9038, the application handle, application filename, document handle and document filename are checked to see if they exist in the File Access Tracking Module log file 403. If they do then control transfers to step 9043, otherwise it proceeds to 9041. In step 9041, the application handle, application filename, document handle and document filename are stored back into the File Access Tracking Module log file 403. Finally, in step 9043 the Snapshot Navigator Menu 301 information is updated and the File Snapshot 305 that was activated is moved to the topmost position and all the other File Snapshots 305 are moved down one position in the File Snapshot list 304. Processing is then returned to the user.

Figure 10:
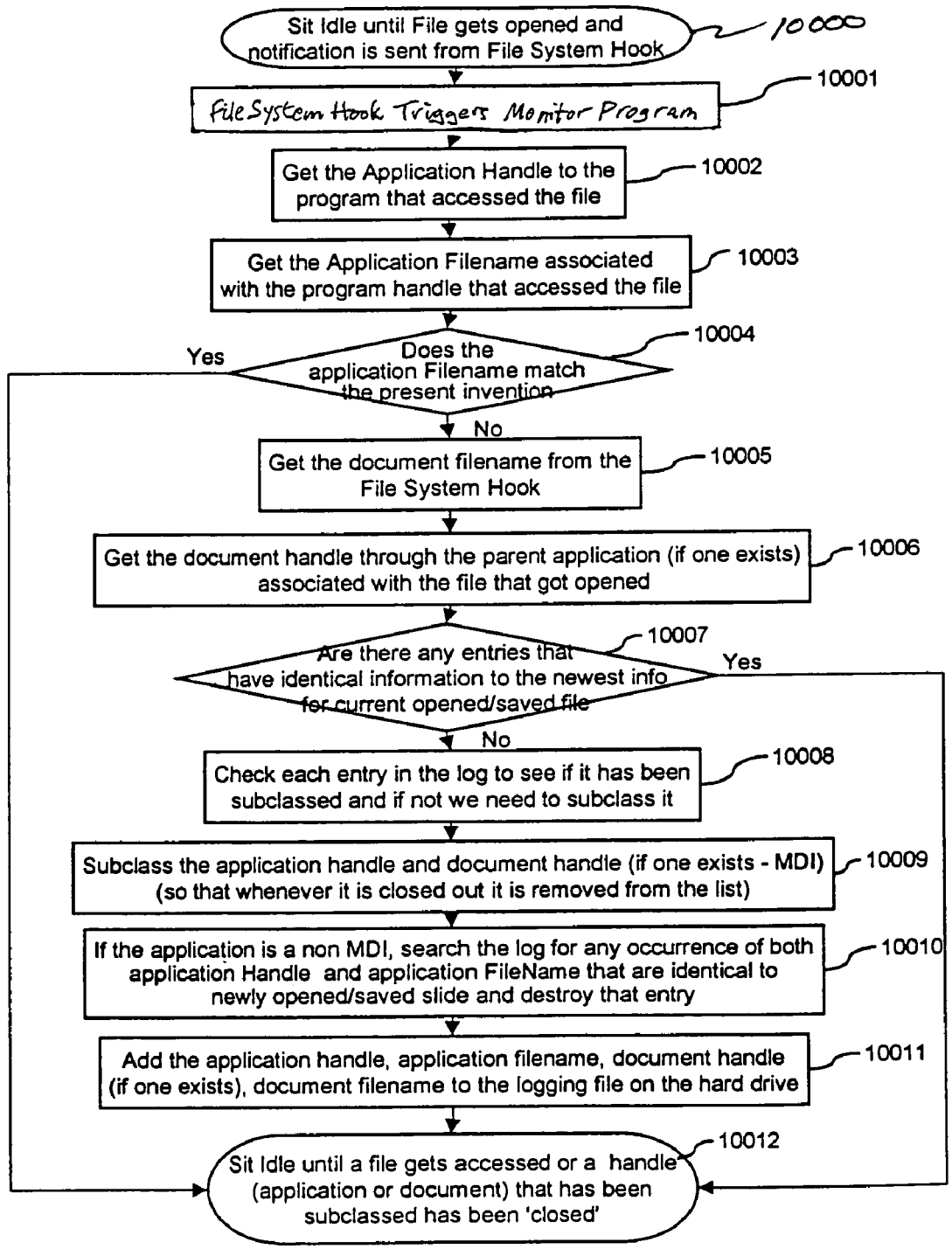
FIG. 10 is a flow diagram of a file access tracking module for tracking opening and saving of documents.

FIG. 10 is a detailed flow diagram of a monitor function of the File Access Tracking Module that logs the files and applications during the opening of existing files and/or the creation of new files. In step 10000, the File Access Tracking Module sits idle, operating as a background task, until it receives a notification from the file system hook of the operating system that a file has been opened or saved and then proceeds to step 10001. The file system hook intercepts all function calls to the operating system from applications that are requesting to open, save, read, write, or delete files, and passes that information to the File Access Tracking Module. In step 10001, the monitor function is notified by the file system hook of a file access. Next, in step 10002, the operating system is queried to determine which application is the current foreground application and the handle for that application is returned from the operating system. In step 10003, the application handle is then evaluated to determine the application filename. Next, in step 10004, the application filename is compared to the filename of the present invention. If they match then control transfers to step 10012, otherwise it continues to step 10005.

In step 10005, the document filename that triggered the notification is retrieved from the file system hook. In step 10006, the active application is then evaluated to determine the document handle, if one exists, for the file that triggered the notification. Next, in step 10007, the recently acquired application handle, application filename, document filename and document handle (if applicable) are compared to the entries in the File Access Tracking Module's log file 403 to see if there are any existing entries that contain this information. If a match for the recently accessed file match an entry in log file 403 then control transfers to step 10012, otherwise it continues to step 10008.

In step 10008, each entry in the File Access Tracking Module log file 403 is checked to see if the application and document handles have not yet been subclassed. If any entries have not been subclassed then they get subclassed, otherwise control proceeds directly to step 10009. In step 10009, the handles for the recently acquired application and document (where applicable) are subclassed. In step 10010, the application is evaluated to determine if it is an MDI-capable application. If it is a non-MDI-capable application then the File Access Tracking Module log file 403 is checked for any previous occurrence of both the application handle and application filename that match the recently acquired application filename and application handle. If such a previous occurrence is found, that specific entry is removed from log file 403. Next, in step 10011, the recently acquired application handle, application filename, document filename and document handle (if applicable) are added to log file 403. In step 10012, the File Access Tracking Module returns processing to the operating system and remains as a background task until triggered by another file system hook notification.

Figure 11:
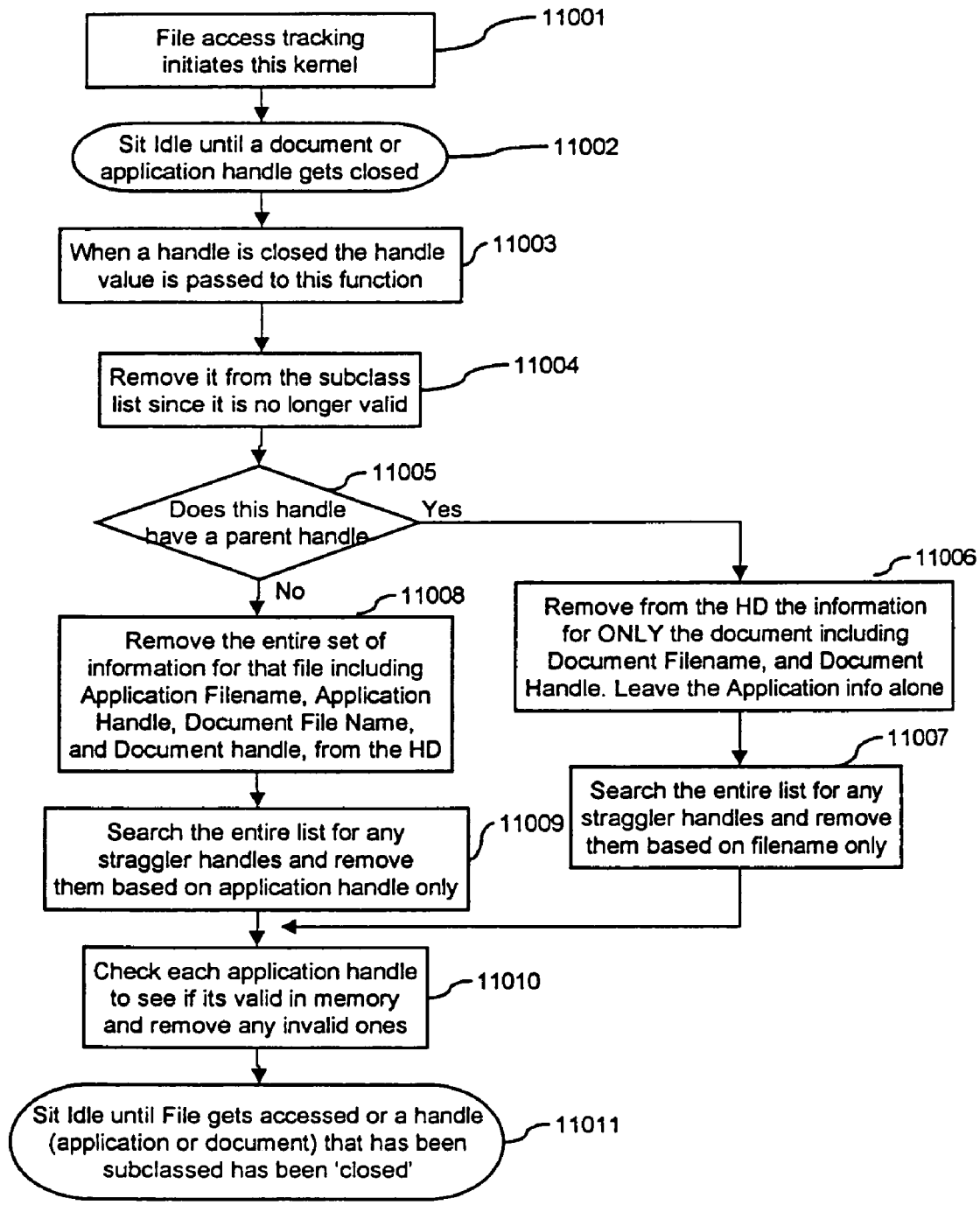
FIG. 11 is a flow diagram of a file access tracking module for tracking closing of application and documents.

FIG. 11 is a detailed flow diagram of another monitor function of the File Access Tracking Module that updates the log file 403 whenever a subclassed application is closed and/or document handle is closed. In step 11001, the File Access Tracking Module initiates a kernel which works in the background waiting for an application handle or document handle to be closed. Next, in step 11002 this tasks sits idle waiting for a handle to be closed which then proceeds to step 11003. In step 11003, the operating system passes the handle value of the window, application or document that was closed to the File Access Tracking Module.

In step 11004, the handle is no longer subclassed by the File Access Tracking Module. Next, in step 11005, this recently closed window handle is checked to determine if it has a parent handle (which would indicate an MDI document). If a parent handle exists then control proceeds to step 11006 (indicating the recently closed window handle is a document handle), otherwise it proceeds to step 11008 (indicating the recently closed window handle is an application handle).

In step 11006, log file 403 is evaluated and any reference to this document filename and document handle are cleared, leaving the application handle and the application filename in log file 403. Next, in step 11007, the entire log file 403 is analyzed and any reference to the document filename, regardless of the document handle, is also cleared, and control proceeds to step 11010.

In step 11008, log file 403 is evaluated and any reference to this application handle is cleared, regardless of application filename and document information. Next, in step 11009, the entire log file 403 is analyzed and any reference to the application handle, regardless of the application filename, document filename or document handle, is also removed. Control then proceeds to step 11010.

In step 11010, each application handle in log file 403 is checked to see if it is valid in memory. Any handles that are no longer valid in memory are removed from log file 403. Next, in step 11011, processing is returned to the operating system and the File Access Tracking Module resumes as a background task until triggered by another file change notification.

Referring now to FIGS. 12 and 13, there is depicted the flow diagram of the 'Template' conversion and retrieving routines, respectively. Templates are duplicates of selected files stored in a specific directory with their graphical thumbnail images and other related information. Retrieving templates is performed by passing template information to the document retrieving routine instead of document information.

In step 12001, the user has selected from the menu to convert a File Snapshot 305 to a 'Template'. Next, in step 12002 the File Snapshot 305 information is duplicated into a specific data directory and a new Template File Snapshot (not shown) is added to the File Snapshot list 304 in the Templates section. In step 12003, the duplicated Template file is mark with a 'READ-ONLY' status to avoid accidental erasure and modifications.

In step 13001, the user has selected a Template File Snapshot. Next, in step 13002 the Template Snapshot information is passed to the document retrieve routine at step 9003 in FIG. 9a, from which point processing of the Template file is performed as discussed above.

An aspect of the present invention is thus that a GUI object created from a screen capture of a document provides an iconic object that retains associated information such as the current active filename, filename path, file object identifier in memory, application, application path, application object identifier in memory, URL address if applicable, etc. Another aspect is provision for a background task that transparently tracks all opened files by filename, filename path, file object identifier in memory, application, application path, application object identifier in memory, URL address if applicable, etc.

Yet another aspect is the ability for the iconic object to bind associated documents automatically to the application which opened or edited the file, independent of the filename extension. It is understood, however, that software according to the present invention could associate a file with an application based on intrinsic file information, such as a file extension or application specific content of the file. Still another aspect is the capability for single click task switching and launching of a specific file within the application that last edited the file. Yet still another aspect is a drag and drop capable iconic desktop (GUI) interface on autohide slideout menu, which facilitates access to desktop icons.

Aspects of the present invention thus allow for re-categorizing files on a user defined relationship independent of the path, in chronological order, and associating them to a visual representation of the file itself, without duplicating or moving the files from their original location. Further aspects provide for gang printing and archiving all or selected files from a bound group by selecting them from the taskbar. Still further aspects provide for storing a listing of a user's files, with graphical thumbnails for quick access and better organization. With one click on a thumbnail, the application and file are launched, The present invention provides still other features, such as the ability to create logical groupings of files based on project, subject matter, presentation, priority, chronological, client, etc., without altering or moving the files from their current location on a system. Files can be made into "template files" and used as a base for future use, providing a template feature for applications with no inherent support for such a feature.

Although the invention has been described in detail with reference to a certain preferred embodiments, variations and modifications exist within the scope and spirit of the invention as described and defined in the following claims.

What is claimed is:

1. A method of accessing one or more computer files via a graphical icon, comprising the steps of:

capturing automatically one or more graphical representations of one or more portions of information content of one or more computer files while an application is manipulating the one or more computer files;

creating automatically an icon including selected portions of the captured one or more graphical representations of the information content of the one or more computer files wherein the icon graphically depicts at least a portion of the information content from the one or more computer files and wherein the icon is created while the application was manipulating the icon's corresponding one or more computer files and includes selected portions of the captured one or more graphical representations of the information content;

linking the icon to the application and to the one or more computer files based on the ability of the application to manipulate the information content of the one or more computer files corresponding to the icon;

storing the icon in a memory;

displaying the icon in a window on a display screen;

invoking the application for manipulating the information content of the one or more computer files upon selection of the icon by accessing the more or more computer files by reference to an underlying file system corresponding to the icon and opening the one or more computer files within the application.

2. The method of claim 1, wherein capturing a graphical representation is initiated by a user input command while the application manipulating the one or more computer files are active.

3. The method of claim 2, wherein the user input command is a keyboard command.

4. The method of claim 1, further comprising the step of storing information related to the application for manipulating the one or more computer files in the memory along with the icon.

5. The method of claim 1, further comprising the step of displaying the window when a cursor is positioned at an edge of the screen display.

6. The method of claim 5, further comprising the step of concealing the window when the cursor is positioned outside the window.

7. The method of claim 1, wherein the step of invoking the application comprises invoking the application and opening the one or more computer files upon a single user input command selecting the icon.

8. The method of claim 7, wherein the single user input command comprises depressing a button when a cursor is placed over the icon.

9. The method of claim 8, wherein the button is a mouse button and the cursor is a mouse-driver cursor.

10. The method of claim 1, wherein if an application is active then the step of invoking the application comprises accessing the active application.

11. The method of claim 1, further comprising the step of storing data related to the one or more computer files and the corresponding application each time the one or more computer files and application is opened and closed during a session, and wherein the step of invoking the application comprises invoking the one or more computer files and the application based on the stored data related to the one or more computer files and corresponding application.

12. The method of claim 11, wherein the data related to the one or more computer files and the corresponding application includes a document path, a document handle, and application path, and an application handle.

13. The method of claim 1, wherein the step of invoking the further includes printing the computer file.

14. The method of claim 1, wherein the step of invoking the application comprises copying the one or more computer files to designated storage device.

15. The method of claim 1, wherein the step of creating an icon comprises creating an icon corresponding to a template file.

16. A method for providing a user interface for accessing a file based on a corresponding icon comprising:
  storing a plurality of icons in a memory along with a corresponding plurality of references to an underlying file system for storage information for a plurality of files, each icon having an appearance substantially depicting information content from its corresponding file, wherein the plurality of icons were created by capturing automatically one or more graphical representations of one or more portions of information content of an icon's corresponding file while an application was manipulating an icon's corresponding file and include selected portions of the captured one or more graphical representations of the information content;
  linking an application to each icon based utility on the ability of the application to manipulate the information content of the file corresponding to the icon;
  providing a window on a display screen for displaying the plurality of icons;
  invoking the application for manipulating the information content of the file corresponding to the selected icon upon selection of an icon from the plurality of icons in the window;
  accessing the file designated by the reference to the underlying file system corresponding to the selected icon; and
  opening the accessed file into the corresponding application.

17. The method of claim 16, wherein the step of storing a plurality of icons in a memory further comprises storing data related to an application for manipulating the corresponding file along with each of the plurality of icons and wherein the step of invoking the application corresponding to the selected icon comprises invoking an application based on the corresponding stored data related to the application.

* * * * *